Nov. 27, 1928.  
E. J. MURPHY  
1,693,314  
MEANS FOR REPRODUCING POSITION  
Original Filed July 9, 1924   2 Sheets-Sheet 1

Inventor:  
Edwin J. Murphy,  
by *Alexander D. Lunt*  
His Attorney.

Nov. 27, 1928.

E. J. MURPHY

MEANS FOR REPRODUCING POSITION

Original Filed July 9, 1924  2 Sheets-Sheet 2

Inventor:
Edwin J. Murphy,
by
His Attorney.

Patented Nov. 27, 1928.

1,693,314

UNITED STATES PATENT OFFICE.

EDWIN J. MURPHY, OF SCHENECTADY, NEW YORK, ASSIGNOR TO GENERAL ELECTRIC COMPANY, A CORPORATION OF NEW YORK.

MEANS FOR REPRODUCING POSITION.

Application filed July 9, 1924. Serial No. 725,077.

My invention relates to means for reproducing position and has for its object the provision of improved means for maintaining an object in positional agreement with a controlling object.

More specifically, my invention relates to means for driving an object into positional agreement with a remote controlling object of the type in which the driven object is actuated by an electric motor which is controlled by the controlling object through the agency of one or more reproducers of the movements of the controlling object, such as described and claimed in U. S. Patent No. 1,559,525 to Edwin J. Murphy and Leonard P. Hutt, dated October 27, 1925, assigned to the same assignee as this invention, of which my present invention is an improvement. My invention is particularly useful in reproducing at a distance the position of an object having angular motion, such as a telescope.

In accordance with my invention I control the circuit of the driving motor for the driven object by means of a contact device which is actuated by a reproducer of the motion of the controlling object. This contact device is operatively connected to the reproducer by means of an electromagnetic connection which permits any amount of independent rotation of the reproducer with practically no restraint, but causes the contact device to reverse the motor every half revolution of such independent rotation. As a result of this action, the motor is controlled to drive the driven object by the shortest path into angular agreement of the controlling object.

For a more complete understanding of my invention reference should be had to the accompanying drawing in which Fig. 4 is a plan view of the device shown in Fig. 3; while

Figures 1, 2:
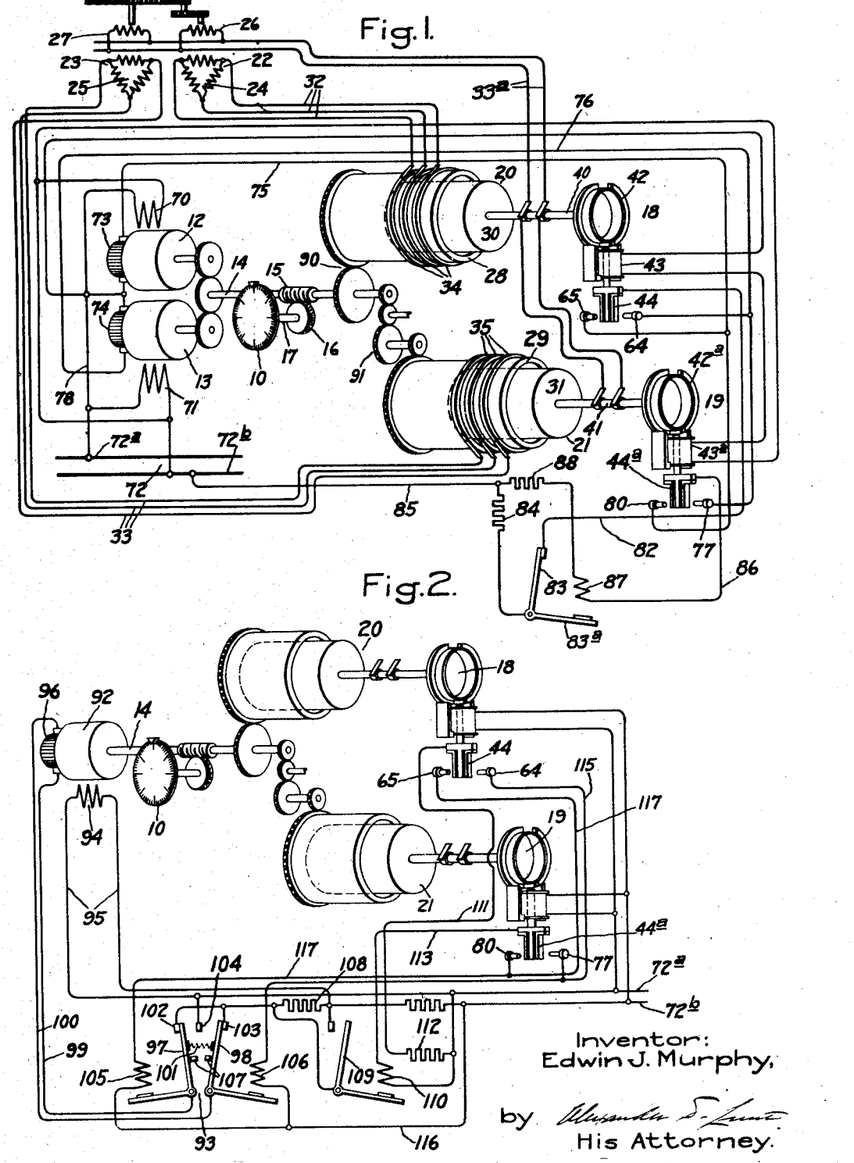
Fig. 1 shows in diagrammatic fashion a system for reproducing position embodying my invention.
Fig. 2 shows in diagrammatic fashion a modified form of my invention.

Referring to the drawing, I have shown my invention in one form as applied to the driving of a position indicator dial 10 so as to maintain it automatically in angular agreement with a remotely situated telescope or sighting device 11. As shown, the dial 10 is driven by two electric motors 12 and 13, the motors being geared to a common driving shaft 14 which is connected through a worm 15 and worm wheel 16 to the driving shaft 17 of the dial. It is contemplated that one of the motors will be used to drive the dial in one direction, while the other will be used to drive the dial in the opposite direction.

The motors 12 and 13 are controlled by means of contact devices 18 and 19 which are actuated by reproducers 20 and 21 of the angular motion of the telescope. These reproducers or receiving devices operate in different ratios with the telescope, the reproducer 20 moving at a suitable high speed ratio such as 72:1, with relation to the telescope, and the reproducer 21 moving at a low speed 1:1 ratio with the telescope. The reproducers 20 and 21 are electrically connected to transmitting devices 22 and 23 respectively which are geared to the telescope in the same ratios in which the reproducers are to be driven such as 72:1 and 1:1 respectively. As shown, the transmitters are connected so as to be actuated in accordance with the angular motion of the telescope in a horizontal plane. The receivers and transmitters 20 to 23 inclusive are of similar construction, each being provided with a polycircuit armature winding and a single circuit field winding, these windings being relatively rotatable. Preferably, the polycircuit winding is on the stator element of the device, while the single circuit winding is on the rotor element. As shown, the transmitting devices 22 and 23 comprise three-circuit stator windings 24 and 25 and field windings 26 and 27 respectively. It will be understood that the reproducers 20 and 21 are similar in construction, the stators 28 and 29 of the reproducers being provided with three-circuit armature windings, and the rotors 30 and 31 being provided with single circuit field windings. Like points of the armature windings of the transmitter 22 and reproducer 20 are connected together by means of conductor 32, and likewise like points of the armature windings of the transmitter 23 and the reproducer 21 are connected together by conductors 33. The field windings of the transmitters and reproducers are connected to a suitable source of alternating current 33ª. Since the stators 28 and 29 of the reproducers are rotatably mounted, connections are made with the conductors 32 and 33 respectively by means of suitable conductor rings 34 and 35, carried by the stators.

In the operation of systems of this character for transmitting angular motion, voltages are induced in the polycircuit stator windings of the transmitting and reproducing devices by the field windings on their respective rotors. When the rotors of the connected transmitter and reproducer are in corresponding angular positions with relation to their stators, the voltages induced in the stator windings are equal and opposite and since like points of the windings are connected together, no current is set up in the armature windings. If the rotor of the transmitter is turned and held in a new position, the voltages then no longer counterbalance, whereby equalizing currents are caused to flow in the armature windings, which currents result in a torque applied to the rotor of the reproducer. This torque causes the rotor of the reproducer to turn to a position corresponding to the position of the transmitter rotor. Any movement applied to the transmitter is therefore reproduced with great accuracy by the reproducer. Another characteristic of systems of this character is that the reproducers turn to angular agreement by the shortest path. That is to say, if the reproducer rotor lags more than 180° its torque will be reversed and be in a direction to cause it to continue the lag and turn into angular agreement by completing a revolution of lag.

Secured to the driving shafts 40 and 41 of the reproducers and forming parts of the contact devices 18 and 19 are cylindrically shaped members 42 and 42$^a$ which carry pole pieces for magnet coils 43 and 43$^a$. These members are rotated by the reproducers and by means of this rotation actuate pivoted contact arms 44 and 44$^a$ whereby the motors 12 and 13 are controlled.

Figure 3:
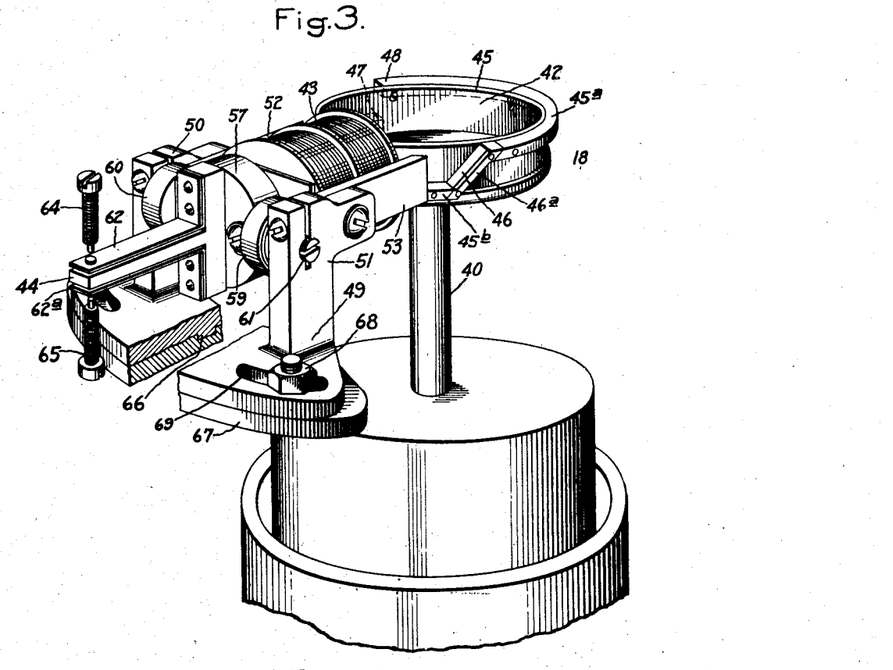
Fig. 3 is an enlarged view in perspective of the control device for the motor.
Figure 4:
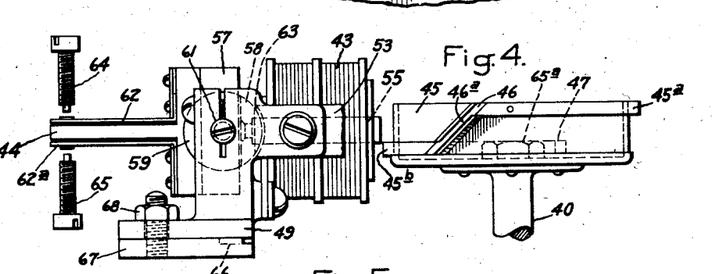
Figure 5:
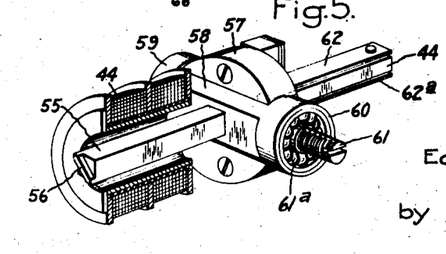
Fig. 5 is a detail view partially in section.

Since the contact devices 18 and 19 are similar in construction only one, contact device 18, will be described in detail. Referring to Figs. 3, 4 and 5, the cylindrical member 42 comprises a cylindrical cup shaped member 45 made of a metal having a low magnetic permeability, such as aluminum. This member is adjustably secured to the driving shaft 40 of the reproducer. On its periphery are two substantially semi-circular strips 45$^a$ and 45$^b$, forming an armature or pole piece, which are secured diametrically opposite each other on opposite ends of the member 45, that is, spaced along the axis of shaft 40. These strips are made of a metal having a high magnetic permeability, such as iron. Two adjacent ends of the strips are connected by a short inclined section 46, made of a similar material. This section preferably makes obtuse angles with reference to the strips 45$^a$ and 45$^b$ and has a narrow outer edge 46$^a$. The opposite ends 47 and 48 of the strips are spaced apart and terminate in a plane passing through the axis of the member 45.

The coil 43 is mounted on a suitable support 49 consisting of two uprights 50 and 51 between which the coil is secured. At the sides of the coil are members 52 and 53 made of magnet core iron, the outer ends of which span the face of the cylindrical member 42 and are close to the strips 45$^a$ and 45$^b$. As shown, the axis of the coil 43 is at right angles to the shaft 40.

A pivotally mounted member 55 of magnet core iron forming an armature pole piece, passes through the coil 43 and on its end is provided with an inclined ridge 56, forming a pole face, which has approximately the same width as the outer edge 46$^a$ of the section 46. Its inclination is such that it is in alinement with section 46 when section 46 is opposite it. This member 55 is pivotally mounted on the uprights 50 and 51. As shown, it has its pivoted end secured to a substantially disc shaped block 57 of insulating material to which is secured a cross bar 58 made of magnet core iron having on its ends ball bearing receptacles 59 and 60. Extending into the bearing receptacles are threaded pins 61, only one of which is shown, which are adjustably secured on the uprights 50 and 51, supporting ball bearings 61$^a$ being provided between the pins and the sides of the receptacles. Secured to the opposite side of the disc block 57 is the contact arm 44 which is provided with two resilient strips 62 and 62$^a$. The contact arm 44 and the member 55 are in alinement and move as one part about the pivot axis formed by pins 61.

It will thus be observed that the coil 43 is provided with a magnetic circuit having three legs, the two outer legs 52 and 53 and the central leg 55. These legs are electromagnetically connected at their inner ends through the cross bar 58 and at their outer ends through one or both of the strips 45$^a$ and 45$^b$ and section 46. The inner ends of legs 52 and 53 are concave to conform with the curvature of the bearing receptacles and are positioned near the bearing receptacles so as to leave but short air gaps 63. In order to prevent the magnetic flux from passing through the bearing balls 61$^a$ and magnetizing them, the uprights 50 and 51 are made of a metal having a low magnetic permeability such as aluminum or bronze.

When the member 42 is rotated with the coil 43 energized, it will be observed that the pivoted member 55 will be swung downward as viewed in Figs. 3, 4 and 5, when strip 45$^b$ is opposite it, will be in an intermediate position when section 46 is opposite it, and will be pulled upward when the strip 45$^a$ is opposite it, whereby the contact arm 44 is moved respectively to engage the upper contact 64, to a position between the contacts, and to engage the lower contact 65. As the pole face 56 passes over section 46 it will be observed that due to the magnetic attraction between them the contact arm is swung slowly from one contact to the other, and when section 46 stands exactly opposite pole face 56 the contact arm is held in mid position. On the other hand, when the pole face 56 passes the ends 47 and 48 it is snapped quickly from one position to the other and cannot come to rest between the contacts.

For the purpose of adjustment the clamping nut $65^a$ may be loosened and the member 42 turned on shaft 40. For small adjustments the bracket 49 may be turned about the shaft 40. As shown, it is provided with a circular projection 66 which fits into a groove in the support 67, the bracket being clamped to the support 67 by bolts 68 extending through slots 69.

Referring again to Fig. 1, the servo motors 12 and 13 are preferably of a direct current shunt type and have their fields 70 and 71 permanently connected to a suitable source of supply 72. The circuits of the armatures 73 and 74 are controlled by the contact devices 18 and 19. One terminal of armature 73 is connected through a conductor 75 to the contact 65 of device 18 and one contact 80 of device 19, while one terminal of armature 74 is connected through a conductor 76 to contact 64 and the other contact 77 of device 19. The other two terminals of the armatures are connected together and through a conductor 78 to one side $72^a$ of the supply source 72. As shown the magnet coils 43 and $43^a$ are connected in series across the supply mains $72^a$ and $72^b$. The contact arm 44 of device 18 is connected through conductor 82, a switch 83, a resistance 84, and a conductor 85 to supply main $72^b$, and contact arm $44^a$ of device 19 is connected through a conductor 86 operating coil 87 of switch 83, resistance 88 and conductor 85 to supply main $72^b$. The switch 83 is biased to closed position by means of the weight of its armature $83^a$.

The stators 28 and 29, as previously indicated, are rotatably mounted. The stator 28 is connected through gearing 90 to driving shaft 14, and the stator 29 is connected through gearing 91 to driving shaft 14. The various driving connections are so arranged that the gear ratio between the stators 28 and 29 is the same as the operating ratio between the rotors 30 and 31, and the gear ratio between stator 28 and the dial 10 is the same as the operating ratio between the rotor 30 and the telescope, that is 72:1, while the gear ratio between the stator 29 and the dial 10 is the same as the operating ratio between the rotor 31 and the telescope, that is 1:1.

As thus constructed and arranged, the operation of my invention is as follows: When the telescope is moved to a new bearing, the rotors 30 and 31 will reproduce this movement in their respective ratios whereby the contact arms 44 and $44^a$ will be actuated. Assume, for example, that the telescope is rotated quickly through a considerable angle in such direction that contact arm 44 is thrown into engagement with contact 64 and contact arm $44^a$ into engagement with contact 77. In such case a circuit will be established from supply main $72^a$ through conductor 78, armature 74, conductor 76, the contact arm $44^a$, conductor 86, coil 87, resistance 88, and conductor 85 to supply main $72^b$. This causes motor 13 to operate in such direction that the motor drives the indicator in a direction corresponding to the direction in which the telescope is being turned, and at the same time drives the stators 28 and 29 in directions opposite to the movements of their rotors whereby the rotors are carried back toward their original angular positions. It will be observed that the energization of coil 87 opened switch 83 whereby the control circuit for contact arm 44 is held open as long as contact arm $44^a$ has control. As the motor 13 operates to rotate the dial and the stators, it will be observed that the members 42 and $42^a$ will be carried back with the rotors of the reproducers toward their previous angular positions until finally member $42^a$ will move contact arm $44^a$ out of engagement with contact 77 and break its control circuit. The control is immediately thereafter taken over by contact arm 44.

Motor 13, however, has given the dial a rough adjustment only under the control of the low speed or coarse reproducer 21. When the motor circuit is broken by contact arm $44^a$, coil 87 is deenergized whereby switch 83 closes in accordance with its bias and the fine reproducer 20 takes control to make the accurate adjustment of the dial 10. It is contemplated that the coarse reproducer 21 due to its low speed ratio will give the dial only a coarse adjustment which will be somewhat short of the correct adjustment. In practice it has been found that the motor does not stop when the control is transferred from the coarse to the fine reproducer. Under the assumed conditions, contact arm 44 will be in engagement with contact 64, whereby a circuit is established from supply main $72^a$ through conductor 78, armature 74, conductor 76, contact arm 44, conductor 82, switch 83, resistance 84, and conductor 85 to supply main $72^b$. The dial will be driven under the control of the fine reproducer until the contact arm 44 is moved to open its circuit whereupon the motor comes to rest, the dial then being in angular agreement with the telescope.

When the telescope is rotated in the opposite direction quickly through a considerable angle, contact arm $44^a$ will be moved into engagement with contact 80, whereby a circuit is closed from supply main $72^a$ through conductor 78, armature 73, conductor 75, contact arm 44ª, conductor 86, coil 87, resistance 88, and conductor 85 to supply main 72ᵇ. This causes motor 12 to operate and drive the dial in the opposite direction from motor 13 until its circuit is momentarily broken by contact arm 44ª and the control given over to the fine reproducer 20 to complete the accurate adjustment of the dial as will be understood from the previous description. In making the fine adjustment in this direction contact arm 44 will be in engagement with the contact 65 whereby a circuit is established from supply main 72ª through conductor 78, armature 73, conductor 75, contact arm 44, conductor 82, switch 83, resistance 84 and conductor 85 to supply main 72ᵇ.

It will be observed that the members 42 and 42ª are rotatable with little restraint and have unlimited freedom of rotation so that the reproducers 20 and 21 are free to turn immediately to positions of agreement with their transmitters. This latter feature is of particular importance when the reproducers are switched on the transmitters with the dial considerably out of angular agreement with the sighting device. If the reproducers were prevented from snapping at once into angular agreement with their transmitters, excessive current would result in the transmitting and receiving instruments whereby they would be overheated. Also the accuracy of any other receiving instruments which might be connected on the same circuit would be impaired. It will also be observed that the dial is always driven through the shortest angle into positional agreement. For example, in case the dial should lag more than 180° for any reason whatever, as might occur if the telescope were swung around with great rapidity, it will be observed that contact arm 44ª will be reversed as the ends 47 and 48 of the strips pass by pole face 56 so that the dial will be driven into angular agreement by completing a revolution of lag. When the reproducers are connected to the transmitters with the dial out of angular agreement with the telescope, the reproducers snap at once into angular agreement with their transmitters by the shortest route, since as has previously been observed this is a characteristic of transmitters and reproducers of the type shown, and the dial is driven in a corresponding direction and hence by the shortest path into angular agreement with the telescope. Under all normal conditions of operation, the reproducers follow their transmitters with a slight lag, and when the transmitters are at rest the reproducers are in exact angular agreement therewith.

Ordinarily during the usual relatively slow training of the telescope, the dial is caused to follow the telescope under the control of the fine reproducer only, and it is only when switching or high speed training is done that the coarse reproducer is called upon to take control.

The resistance 84 which is included in the motor circuit when the fine reproducer has control may have a higher resistance than 88 whereby the motor operates at a lower speed when the fine reproducer has control and may consequently be stopped more accurately.

Although both coarse and fine control systems have been shown, it is contemplated that one system only may be used. Ordinarily where one control system only is used, this system will be the coarse one. As has been previously indicated when both systems are used, each system operates independently of the other in effecting its particular adjustment of the dial.

While the coarse reproducer has control the motor may turn the fine reproducer, by means of the driving connection with its stator, through a number of revolutions. For example, if the dial should lag 12 degrees, the motor in making the coarse adjustment will turn the fine reproducer somewhat less than 72 x 12 or 864 degrees which is 2 revolutions and 144 degrees. The electromagnetic driving connection between the fine reproducer and its contact arm, however, allows the fine reproducer to turn independently of the contact arm with practically no coercion. During this movement it will be observed that the contact arm operated by the fine reproducer will be reversed each half revolution. When the coarse reproducer finally gives up the control somewhat short of the correct position of the dial, the contact arm operated by the fine reproducer will be in position to continue the movement of the dial and complete the accurate adjustment. The magnetic driving connection thus allows the complete revolutions given the fine reproducer by the motor to be entirely neglected.

In the modified form shown in Fig. 2 a single driving motor 92 of the direct current shunt type is provided. This motor is controlled to rotate in both directions by means of the contact devices 18 and 19 through the interposition of a switch 93. The field 94 of the motor is permanently connected by means of conductors 95 to the supply mains 72ª and 72ᵇ and the motor is controlled by controlling the energy supplied to its armature 96.

The relay 93 comprises two contact arms 97 and 98 which are electrically connected through conductors 99 and 100 to the terminals of the armature 96. These contact arms are forced apart by means of an insulated spring 101 into engagement with fixed contacts 102 and 103 respectively, and they are actuated into engagement with a central fixed contact 104 by means of operating coils 105 and 106. In order to prevent the engagement of both contact arms with the contact 104 at the same time, interlocking insulated projections 107 are provided on the contact arms. When either one of the contact arms is in engagement with contact 104 the other is prevented from engaging by the engagement of the projections 107. The contacts 102 and 103 are electrically connected together and to supply main 72$^b$. When the arms 97 and 98 are in engagement with contacts 102 and 103 it will be observed therefore, that the motor armature 96 is short circuited for dynamic braking, while the contact 104 is electrically connected to main 72$^a$. Included in the connection between contacts 102 and 103 and supply main 72$^b$ is a resistance 108 which may be short-circuited by means of a switch arm 109. This switch arm is biased to open circuit position, by the weight of its operating armature and may be moved to closed circuit position to short-circuit the resistance by energizing an operating coil 110.

Contact arm 44 is connected through a conductor 111 and a resistance 112 to supply main 72$^a$, and contact arm 44$^a$ is connected by way of a conductor 113 through operating coil 110 to supply main 72$^a$. The stationary contacts 64 and 77 are connected by way of a conductor 115 through operating coil 106 and conductor 116 to supply main 72$^b$. Contacts 65 and 80 are connected by way of conductor 117 through operating coil 105 and conductor 116 to supply main 72$^b$.

It will be understood that the driving connections between the shaft 14 of motor 92 and the dial 10 and the stators of the reproducers are the same as shown in Fig. 1. It will also be understood that the reproducers 20 and 21 are electrically connected to transmitting devices which are operated by movement of a controlling object substantially as shown in Fig. 1.

The operation of the modified form shown in Fig. 2 is the same as the operation of the form shown in Fig. 1 with the exception, however, that the contact devices 18 and 19 do not open and close the circuits of the driving motor, but instead control the relay 93 which in turn opens and closes the circuit of motor 92 for both directions of rotation. Assuming now an angular movement of the controlling object of such magnitude and in such direction that the contact arm 44$^a$ is moved into engagement with contact 80, a circuit is thereby closed from supply main 72$^a$ through coil 110, conductor 113, the contact arm 44$^a$, conductor 117, operating coil 105, and conductor 116 to supply main 72$^b$. The energization of coil 105 throws contact arm 97 into engagement with contact 104 whereby a circuit for the motor is closed from supply main 72$^a$ through this contact arm, conductor 99, the armature 96, conductor 100 and contact arm 98 to supply main 72$^b$. The motor 92 is thus caused to rotate in a direction to cause the dial 10 to follow the controlling object. By reason of the fact that coil 110 is energized resistance 108 is short circuited during the operation of the motor under the control of contact arm 44$^a$ so that the motor operates at high speed. After the dial 10 has been driven into angular agreement within the limit of the accuracy of the coarse reproducer, contact arm 44$^a$ will be moved away from contact 80 whereby coil 105 is deenergized and the control transferred to the fine reproducer. The contact arm 44 will then be in engagement with contact 65 whereby the control circuit is maintained from supply main 72$^a$ through resistance 112, conductor 111, the contact arm, conductor 117, coil 105, and conductor 116 to supply main 72$^b$. This maintains the energization of coil 105 keeping contact arm 97 in engagement with contact 104 whereby the motor continues to operate in the same direction as before to complete the adjustment of the dial, the motor circuit being broken by contact arm 97 when the dial has been moved into accurate angular agreement by the movement of contact arm 44 to open the control circuit. Contact arm 97 then moves into engagement with contact 102 in accordance with its bias whereby the motor is brought to rest quickly by dynamic braking.

It will be observed that when the motor is operating under the control of the fine reproducer coil 110 is not energized and the resistance 108 is therefore included in the armature circuit of the motor so that it operates at a slower speed and can consequently be stopped much quicker than would be possible when operating at high speed under the control of the coarse reproducer. This facilitates the stopping of the dial in accurate angular agreement with the controlling object.

If the telescope is moved in the opposite direction contact arm 44$^a$ will be moved into engagement with contact 77 whereby a circuit is closed from supply main 72$^a$ through coil 110, conductor 113, the contact arm, conductor 115, coil 106, and conductor 116 to supply main 72$^b$. This energizes coil 106 which throws contact arm 98 into engagement with contact 104 whereby a circuit is closed in the reverse direction for the armature of the motor from supply main 72$^a$ through the contact arm 98, conductor 100, armature 96, conductor 99 and contact arm 97 to supply main 72$^b$. The motor then operates under the control of the coarse reproducer for the coarse adjustment, the control being then turned over to the fine reproducer to complete the accurate adjustment of the dial. When the control circuit is broken by contact arm 44$^a$ as the coarse reproducer gives up the control, contact arm 44 will be in engagement with contact 64 whereby the control circuit is maintained from supply main 72$^a$ through resistance 112, conductor 111, contact arm 44, conductor 115, coil 106, and conductor 116 to supply main 72$^b$. The motor then operates under the control of the fine reproducer until the dial has been moved accurately into angular agreement with the telescope when the control circuit is broken by means of contact arm 44 and the motor brought quickly to rest by dynamic braking as before.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States is:—

1. Means for reproducing position comprising in combination with a controlling movable object and a driven movable object, a motor for driving said driven object, control means for said motor, an electrical system for reproducing angular motion including an electrical transmitting device driven by said controlling object and an electrical reproducing device provided with a rotor member, electrical connections between said transmitting device and said reproducing device whereby said rotor is caused to follow the movements of said controlling object, and a magnetic connection between said rotor and said control means for actuating said control means upon movement of said controlling object so as to cause the motor to drive the driven object into positional agreement with the controlling object.

2. Means for reproducing position comprising in combination with a controlling movable object and a driven movable object, a motor for driving said driven object, control means for said motor, an electrical system for reproducing angular motion including an electrical transmitting device driven by said controlling object and an electrical reproducing device provided with a rotor member, electrical connections between said transmitting device and said reproducing device whereby said rotor is caused to follow the movements of said controlling object, and a magnetic operating connection between said rotor and said control means so arranged that upon a slight movement of said controlling object in either direction said control means is actuated to cause said motor to drive the driven object into positional agreement with the controlling object.

3. Means for reproducing position comprising in combination with a controlling movable object and a driven movable object a motor for driving said driven object, control means for said motor, an electrical system for reproducing angular motion including an electrical transmitting device driven by said controlling object and an electrical reproducing device provided with a rotor member, electrical connections between said transmitting device and said reproducing device whereby said rotor is caused to follow the movements of said controlling object, and a magnetic connection between said rotor and said control means so arranged that the motor is caused to drive the driven object into positional agreement with the controlling object by the shortest path thereto regardless of the course of the controlling object.

4. Means for reproducing position comprising in combination with a controlling movable object and a driven movable object, a motor for driving said driven object, control means for said motor, an electrical system for reproducing angular motion including an electrical transmitting device driven by said controlling object and an electrical reproducing device provided with a rotor member, electrical connections between said transmitting device and said reproducing device whereby said rotor is caused to follow the movements of said controlling object, and a magnetic operating connection between said rotor and said control means permitting independent movement thereof but causing said control means to reverse said motor every half revolution of such independent movement.

5. Means for reproducing position comprising in combination with a controlling movable object and a driven movable object, a motor for driving said driven object, control means for said motor, an electrical system for reproducing angular motion including an electrical transmitting device driven by said controlling object and an electrical reproducing device provided with a rotor member, electrical connections between said transmitting device and said reproducing device whereby said rotor is caused to follow the movements of said controlling object, and a magnetic operating connection between said rotor and said control means permitting independent movement thereof but causing said control means to reverse said motor every half revolution of such independent movement and being arranged to maintain said control means in open circuit position at one of the points of reversal.

6. Means for reproducing position comprising in combination with a controlling movable object and a driven movable object, a motor for driving said driven object, two movable mutually attracting magnet pole pieces, control means for said motor connected to one of said pole pieces, and a driving connection between the other pole piece and said controlling object, whereby said first pole piece is actuated upon movement of the controlling object to cause the motor to drive the driven object into positional agreement with the controlling object.

7. Means for reproducing position comprising in combination with a controlling movable object and a driven movable object, a motor for driving said driven object, control means for said motor, a movable magnet pole piece connected to said control means, and a rotatable magnet pole piece driven by said controlling object arranged to move said movable pole piece to one of two positions to start the motor upon movement of said controlling object so as to cause said motor to drive the driven object into positional agreement with the control object.

8. Means for reproducing position comprising in combination with a controlling movable object and a driven movable object, a motor for driving said driven object, control means for said motor, a pivoted magnet pole piece connected to said control means, and a rotatable magnet pole piece driven by said controlling object arranged to swing said pivoted pole piece to one of two positions to start the motor upon movement of said controlling object whereby said motor is caused to drive the driven object into positional agreement with the control object.

9. Means for reproducing position comprising in combination with a controlling movable object and a driven movable object, a motor for driving said driven object, control means for said motor, a movable magnet pole piece connected to said control means, a reproducer of angular motion responsive to the movements of said controlling object, and a rotatable magnet pole piece having axially displaced portions driven by said reproducer in operative relation to said first pole piece, whereby said first pole piece is actuated upon movement of the controlling object to cause the motor to drive the driven object into positional agreement with the controlling object.

10. Means for reproducing position comprising in combination with a controlling movable object and a driven movable object, a motor for driving said driven object, control means for said motor, a magnet pole piece connected to said control means, a reproducer of angular motion responsive to the movements of said controlling object, and an open ring magnet pole piece driven by said reproducer in operative relation to said first pole piece, said open ring pole piece having its ends displaced axially, whereby said first pole piece is actuated upon movement of the controlling object to cause the motor to drive the driven object into positional agreement with the controlling object.

11. Means for reproducing position comprising in combination with a controlling movable object and a driven movable object, a motor for driving said driven object, control means for said motor, a movable magnet pole piece connected to said control means, a reproducer of angular motion responsive to the movements of said controlling object, and a circular magnet pole piece driven by said reproducer in operative relation to said first pole piece, said circular pole piece comprising portions displaced axially, whereby said first pole piece is actuated upon movement of the controlling object to cause the motor to drive the driven object into positional agreement with the controlling object.

12. Means for reproducing position comprising in combination with a controlling movable object and a driven movable object, a motor for driving said driven object, control means for said motor, a magnet pole piece connected to said control means, a reproducer of angular motion responsive to the movements of said controlling object, and an open ring magnet pole piece driven by said reproducer in operative relation to said first pole piece, said open ring pole piece comprising two axially displaced substantially semi-circular portions and an axially and circumferentially extending central section connecting said portions, whereby said first pole piece is actuated upon movement of the controlling object to cause the motor to drive the driven object into positional agreement with the controlling object.

13. Means for reproducing position comprising in combination with a controlling movable object and a driven movable object, a motor for driving said driven object, control means for said motor, a reproducer of angular motion responsive to the movements of said controlling object, a magnet coil, a pivoted member forming a part of the magnetic circuit of said coil operatively connected to said control means, and a rotatable member having axially displaced portions forming a part of the magnetic circuit of said coil driven by said reproducer in front of the movable end of said pivoted member, whereby said pivoted core leg is rocked on its pivot upon movement of the controlling object and the motor thereby caused to drive the driven object into positional agreement with the controlling object.

14. Means for reproducing position comprising in combination with a controlling movable object and a driven movable object, a motor for driving said driven object, control means for said motor, a reproducer of angular motion responsive to the movements of said controlling object, a magnet coil, a pivoted member forming a part of the magnetic circuit of said coil operatively connected to said control means, and a circular member forming a part of the magnetic circuit of said coil driven by said reproducer in front of the movable end of said pivoted core leg, said circular member comprising axially displaced portions connected by an axially and circumferentially extending portion, whereby said pivoted member is rocked on its pivot upon movement of the controlling object and the motor thereby caused to drive the driven object into positional agreement with the controlling object.

15. Means for reproducing position comprising in combination with a controlling movable object and a driven movable object, a motor for driving said driven object, control means for said motor including a pivoted contact arm, a reproducer of angular motion responsive to the movements of said controlling object, a magnet coil, a magnet member extending through said coil secured to the pivoted end of said contact arm so as to be movable with said contact arm about its pivot, and a rotatable member comprising axially displaced portions forming a part of the magnetic circuit of said coil driven by said reproducer in front of the movable end of said pivoted member whereby said pivoted member is rocked on its pivot upon movement of the controlling object and the motor thereby caused to drive the driven object into positional agreement with the controlling object.

16. Means for reproducing position comprising in combination with a controlling movable object and a driven movable object, an electric motor for driving said driven object, a contact device for controlling said motor, a stationary magnet coil, a pivoted member forming a part of the magnetic circuit of said coil connected to said contact device, a circular rotatable member forming a part of the magnetic circuit of said coil, said circular member having its ends axially displaced, a reproducer of angular motion responsive to the movements of said controlling object, a driving connection between said reproducer and said circular member whereby upon rotation of said circular member by said reproducer said pivoted member is rocked to one of two extreme positions to start the motor, and a driving connection between said motor and the stator of said reproducer so arranged that said reproducer is turned as a whole by said motor in a direction opposite to the movement of its rotor whereby said pivoted member is actuated by the circular member to stop the motor when the driven object has been moved into positional agreement with the controlling object.

17. Means for reproducing position comprising in combination with a controlling movable object and a driven movable object, a motor for driving said driven object, control means for said motor, a reproducer of angular motion responsive to the movements of said controlling object, a magnetic operating connection between said reproducer and said control means whereby said control means is actuated by movement of said controlling object to close the circuit of said motor, and an operating connection between said motor and said control means whereby the circuit of the motor is opened when the driven object assumes the position of the controlling object.

18. Means for reproducing position comprising in combination with a controlling object and a driven object, an electric motor for driving said driven object, a reproducer of angular motion responsive to the movements of said controlling object, a rotatably mounted stator for said reproducer, control means for said motor and a magnetic operating connection between said control means and said reproducer so arranged that upon the slight movement of the controlling object in either direction said control means is actuated to close the circuit of said motor and an operating connection between said motor and said stator whereby the moving element of said reproducer is actuated jointly with said stator to open the circuit of said motor when the driven object assumes positional agreement with the controlling object.

19. Means for reproducing position comprising in combination with a controlling movable object and a driven movable object, a motor for driving said driven object, control means for said motor, coarse and fine reproducers of angular motion responsive to the movements of said controlling object, and magnetic operating connections between said reproducers and said control means whereby said motor is operated under the direction of said reproducers so as to drive the driven object into positional agreement with the controlling object.

20. Means for reproducing position comprising in combination with a controlling movable object and a driven movable object, a motor for driving said driven object, control means for said motor, coarse and fine reproducers of angular motion responsive to the movements of said controlling object, two pairs of movable mutually attracting magnet pole pieces, connections between said control means and one pole piece of each pair, and driving connections between the other pole pieces and said reproducers respectively whereby said motor is caused to drive the driven object into positional agreement with the controlling object.

21. Means for reproducing position comprising in combination with a controlling movable object and a driven movable object, a motor for driving said driven object, control means for said motor, coarse and fine reproducers of angular motion responsive to the movements of said controlling object, movable magnet pole pieces connected to said control means, and rotatable magnet pole pieces having axially displaced portions driven by said reproducers in operative relation to said first pole pieces whereby said first pole pieces are actuated upon movement of the controlling object to cause the motor to drive the driven object into positional agreement with the controlling object.

22. Means for reproducing position comprising in combination with a controlling movable object and a driven movable object, a motor for driving said driven object, control means for said motor, coarse and fine reproducers of angular motion responsive to the movements of said controlling object, movable magnet pole pieces connected to said control means, and circular magnet pole pieces driven by said reproducers respectively in operative relation with said first pole pieces, said circular pole pieces being provided with portions displaced axially whereby said motor is controlled to drive the driven object into positional agreement with the controlling object.

23. Means for reproducing position comprising in combination with a controlling movable object and a driven movable object, a motor for driving said driven object, control means for said motor, coarse and fine reproducers of angular motion responsive to the movements of said controlling object, a pair of magnet coils, pivoted members forming a part of the magnetic circuits of said coils operatively connected to said control means, and rotatable members provided with axially displaced portions forming parts of the magnetic circuits of said coils driven by said reproducers in front of the movable ends of said pivoted members respectively whereby said pivoted members are rocked upon movement of the controlling object and the motor thereby caused to drive the driven object into positional agreement with the controlling object.

24. Means for reproducing position comprising in combination with a controlling movable object and a driven movable object, an electric motor for driving said driven object, a pair of contact devices for controlling said motor, a pair of magnet coils, pivoted members forming a part of the magnetic circuits of said coils connected to said contact devices respectively, circular rotatable members forming a part of the magnetic circuits of said coils, said circular members having their ends axially displaced, coarse and fine reproducers of angular motion responsive to the movements of the said controlling object, said reproducers having their stators rotatably mounted, driving connections between said reproducers and said circular members whereby upon rotation of said circular members by said reproducers said pivoted members are rocked on their pivots to start the motor, and driving connections between said motor and the stators of said reproducers so arranged that said reproducers are turned as a whole by said motor in directions opposite to the movements of their rotors whereby said pivoted members are actuated by said circular members to stop the motor when the driven object has been moved into positional agreement with the controlling object.

In witness whereof, I have hereunto set my hand this 8th day of July, 1924.

EDWIN J. MURPHY.